United States Patent [19]

Kobayashi et al.

[11] 4,095,268

[45] June 13, 1978

[54] SYSTEM FOR STOPPING AND RESTARTING THE OPERATION OF A DATA PROCESSOR

[75] Inventors: Yoshiki Kobayashi; Tadaaki Bandoh; Hideo Maejima, all of Hitachi; Hajime Yasuda, Katsuta, all of Japan

[73] Assignee: Hitachi, Ltd., Japan

[21] Appl. No.: 712,803

[22] Filed: Aug. 9, 1976

[30] Foreign Application Priority Data

Aug. 8, 1975 Japan .................................. 50-95770

[51] Int. Cl.$^2$ ............................. G06F 1/04; G06F 3/02
[52] U.S. Cl. .................................................. 364/200
[58] Field of Search ... 364/900 MS File, 200 MS File

[56] References Cited

U.S. PATENT DOCUMENTS

| | | | |
|---|---|---|---|
| 3,405,258 | 10/1968 | Godoy | 364/200 |
| 3,760,171 | 9/1973 | Wang | 364/200 |
| 3,774,163 | 11/1973 | Recoque | 364/200 |
| 3,781,810 | 12/1973 | Downing | 364/200 |
| 3,798,614 | 3/1974 | Meadows | 364/200 |
| 3,909,802 | 9/1975 | Cassarino, Jr. | 364/200 |
| 3,944,985 | 3/1976 | Brandstaetter | 364/200 |
| 3,974,480 | 8/1976 | Gernelle | 364/200 |

Primary Examiner—James D. Thomas
Attorney, Agent, or Firm—Craig & Antonelli

[57] ABSTRACT

In an electronic computer system wherein, when a microprogram-controlled central processing unit receives a stop signal from a console, the contents of a group of registers are assigned to predetermined fixed areas in a main memory and, in response to a start signal, the assigned contents of the group of registers are delivered from the fixed areas to the group of registers. The reading and writing of the contents of the group of registers within the central processing unit is effected for the fixed areas of the main memory in which the contents are assigned.

5 Claims, 8 Drawing Figures

| 0 1 2 3 | 4 5 6 7 | 8 9 10 11 | 12 13 | 14 15 | 16 17 | 18 19 | 20 21 22 23 24 25 26 27 28 29 30 31 32 33 34 35 | | |
|---|---|---|---|---|---|---|---|---|---|
| FUN | REG A | REG B | R E G W | M A R S | SEL | M E X | M W | MOD | LITERAL |
| | | | | | | | | | FLAG | TEST | JUMP ADDR |

FIG. 8

| | FUN | REG A | REG B | REGW | MARS | SEL | MEX | MW | MOD | LITERAL | | |
|---|---|---|---|---|---|---|---|---|---|---|---|---|
| | | | | | | | | | | FLAG | TEST | JUMP ADDR |
| 90 → | — | — | — | 0 | 0 | — | 0 | — | 11 | 0000 | STOP SIGNAL | * |
| | ≀ | ≀ | ≀ | ≀ | ≀ | ≀ | ≀ | ≀ | ≀ | ≀ | ≀ | ≀ |
| 91 * | B'→C | — | — | 0 | 1 | L | 0 | — | 10 | LIT(0000)₁₆ | | |
| | A→C | #0 | — | 0 | 0 | — | 1 | 1 | 10 | — | | |
| | B'→C | — | — | 0 | 1 | L | 0 | — | 10 | LIT(0001)₁₆ | | |
| | A→C | #1 | — | 0 | 0 | — | 1 | 1 | 10 | — | | |
| | ⋮ | ⋮ | ⋮ | ⋮ | ⋮ | ⋮ | ⋮ | ⋮ | ⋮ | ⋮ | | |
| | A→C | #15 | — | 0 | 0 | — | 1 | 1 | 10 | — | | |
| | — | — | — | 0 | 0 | — | 0 | — | 11 | RUIN FF RESET | UNCONDITIONAL | ** |
| | ≀ | ≀ | ≀ | ≀ | ≀ | ≀ | ≀ | ≀ | ≀ | ≀ | ≀ | ≀ |
| 92 ** | B'→C | — | — | 0 | 1 | L | 0 | — | 10 | LIT(0000)₁₆ | | |
| | B'→C | — | #0 | 1 | 0 | DATA BUS | 1 | 0 | 10 | — | | |
| | B'→C | — | — | 0 | 1 | L | 0 | — | 10 | LIT(0001)₁₆ | | |
| | B'→C | — | #1 | 1 | 0 | DATA BUS | 1 | 0 | 10 | — | | |
| | ⋮ | ⋮ | ⋮ | ⋮ | ⋮ | ⋮ | ⋮ | ⋮ | ⋮ | ⋮ | | |
| | B'→C | — | #15 | 1 | 0 | DATA BUS | 1 | 0 | 11 | 0000 | UNCONDITIONAL | *** |
| | ≀ | ≀ | ≀ | ≀ | ≀ | ≀ | ≀ | ≀ | ≀ | ≀ | ≀ | ≀ |

SYSTEM FOR STOPPING AND RESTARTING THE OPERATION OF A DATA PROCESSOR

BACKGROUND OF THE INVENTION

It is a common practice to carry out, from a console, status control (start, stop and reset) and status indication (error status indication and run/stop indication) of a central processing unit, data reference and data writing (hereinafter termed "read/write") of a group of registers, etc.

In a random logic-controlled CPU, all the instructions from the console are assembled in a hard wired logic control unit. In a microprogram-controlled CPU, the controls for the instructions from the console are to be carried out by the microprogram control as far as possible.

In the case of a microprogram control system, an appropriate link between the instructions from the console and the microprogram control is required. Where it is desired to make the size of the central processing unit as small as possible, it is favorable to reduce the amount of hardware for such a link to the smallest possible extent.

Regarding the reading and writing of the contents of a group of registers within the central processing unit, the following two methods have hitherto been known:

One is a method in which the reading and writing from or into the group of registers is controlled directly by the microprogram control.

According to this method, an address at which microprogram control data is stored is supplied from the console to the central processing unit. The central processing unit sets the address in a microprogram address register upon the condition that the usual microprogram control is stopped, and the microprogram control data is delivered from a microprogram memory on the basis of the address, whereby reading and writing operations for designated registers are carried out.

The other method consists in controlling the reading and writing operations for a group of registers independently of microprogram control.

According to this method, a register address is delivered from the console to the central processing unit, and the central processing unit carries out the reading and writing of the contents of the registers on the basis of the register address, upon the condition that the usual microprogram control is stopped.

In either method, a large amount of hardware is required for the central processing unit in order to read and write the contents of the registers within the central processing unit from the console.

SUMMARY OF THE INVENTION

It is a principal object of the invention to reduce the amount of hardware for a central processing unit for reading and writing the contents of a group of registers within the central processing unit from a console.

Another object of the invention is to make it possible, by a simple method, to read and write the contents of a memory from a console.

A feature of the invention is that the contents of a group of registers within a central processing unit are assigned to or stored in to predetermined fixed areas in a main memory in response to a stop signal from a console, while the contents of the fixed areas are restored to the group of registers in response to a start signal from the console.

Another feature of the invention is that, where the contents of the registers within the central processing unit are to be read out and written from the console, the read/write operation is carried out for the corresponding fixed areas of the main memory in which the contents are assigned.

Still another feature of the invention is that address designation for the main memory is effected by address switches for designating the upper digits of addresses and an address rotary switch for designating the lower digits of the addresses, while the fixed areas of the main memory are designated by the address rotary switch.

BRIEF DESCRIPTION OF THE DRAWING

FIG. 8 is a diagram of an example of microprogram processing according to the invention.

DETAILED DESCRIPTION OF THE INVENTION

Figure 1:
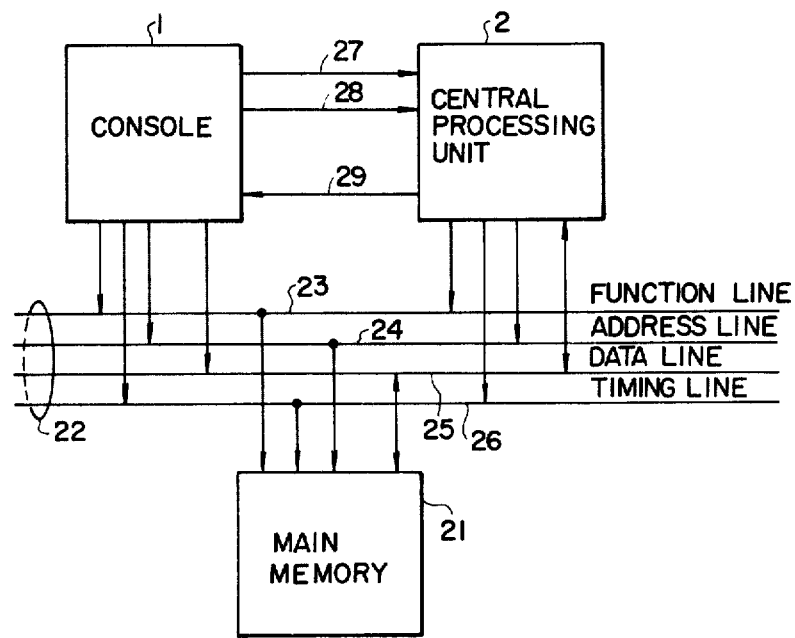
FIG. 1 is a general block diagram of an example of a microprogram-controlled electronic computer system to which the invention is applied.

In FIG. 1, console 1 as well as a central processing unit 2 and a main memory 21 are coupled by an interface bus 22. A start signal line 27 and a stop signal line 28 are coupled from the console 1 to the central processing unit 2, while a status signal line 29 indicating the stop state of the central processing unit 2 is fed from the central processing unit 2 to the console 1.

The interface bus 22 is constructed of a function line 23 for indicating "read" or "write," an address line 24, a data line 25 and a timing line 26. The function line 23, the address line 24 and the timing line 26 connect the console 1 and the central processing unit 2 to the main memory 21. The data line 25 is incorporated among the devices as a bidirectional signal line.

Figures 2, 3:
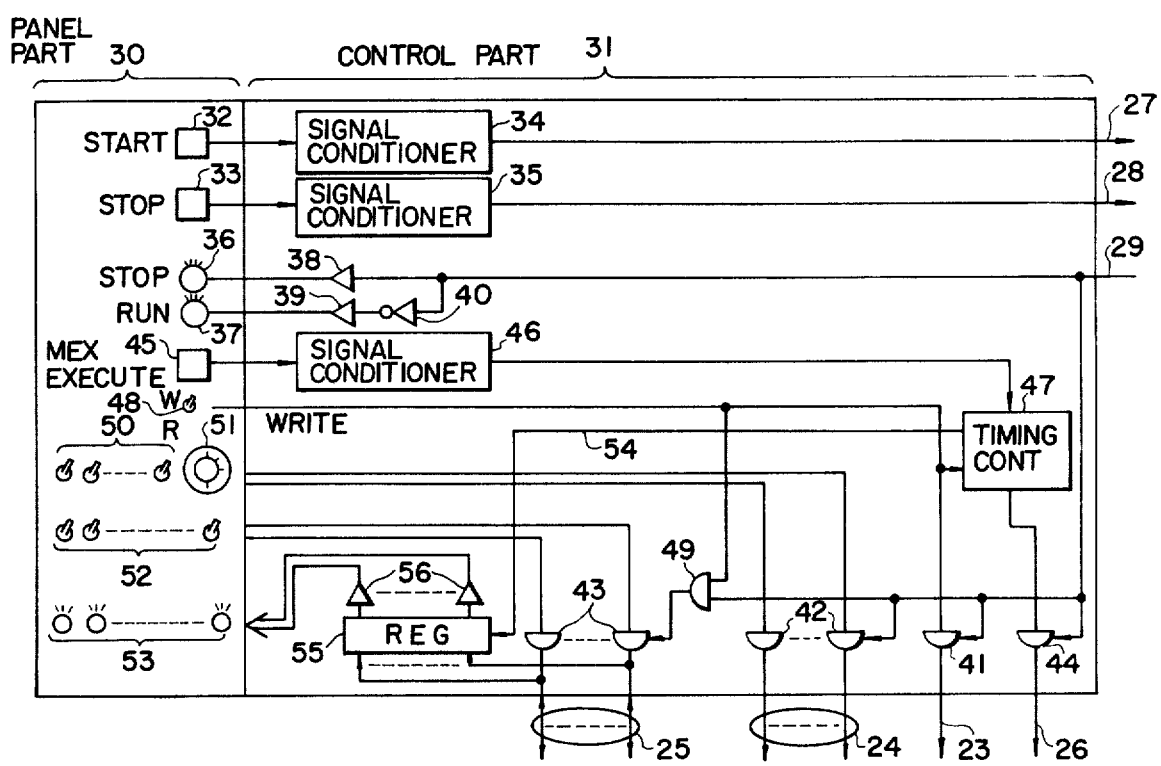
FIG. 2 is a diagram of an example of the internal construction of a console shown in FIG. 1.
FIG. 3 is a diagram of an example of a microprogram format which is applied to the invention.

FIG. 2 shows an example of the internal construction of the console 1. It consists of a panel part 30 and a control part 31.

When a start button 32 and a stop button 33 are depressed, a start signal over line 27 and a stop signal over line 28 are respectively delivered to the central processing unit (hereinbelow abbreviated to "CPU") 2 through respective signal conditioners 34 and 35.

During the stop state of the CPU 2, a stop status signal 29 exists, so that a stop lamp 36 is driven by a lamp driver 38. During the operation or run of the CPU 2, the stop status signal 29 does not exist, so that a run lamp 37 is driven by a NOT gate 40 and a lamp driver 39. Thus, the status of the CPU 2 is indicated by lamps 36 and 37.

When the CPU 2 is in the stop state, i.e., the stop status signal 29 exists, a function driver 41, an address driver 42 and a timing driver 44 are rendered active.

Further, when the "write" operation ("1") is designated by a read/write switch 48, (the output of the switch 48 is selected to be "1" for "write" and "0" for "read") data driver 43 is rendered active through an AND gate 49.

When a memory execute button 45 is depressed at this time, a signal is supplied to the timing line 26 through a signal conditioner 46 and a timing control circuit 47. The address designated by address switches 50 and by an address rotary switch 51 (a signal on the address line 24) is supplied, and data designated by data switches 52 (a signal on the data line 25) is written into the designated address of the main memory 21.

On the other hand, when the "read" operation ("0") is designated by the read/write switch 48, the data driver 43 is inhibited, and the contents of the main memory 21 which corresponds to the address designated by the address switches 50 and the address rotary switch 51 (the contents of the address line 24) are read out to the data line 25. The read out contents are in a register 55 by timing 54 from the timing line control circuit 47 and are indicated on data lamps 53 through data lamp drivers 56.

In this way, the status control of the CPU 2 and the read/write operations from or into the main memory 21 are performed.

The reason why the address switches 50 and the address rotary switch 51 are separately provided is as follows. The address switches 50 correspond to the upper digits of an address. The address of the main memory 21 indicated by the value of the address rotary switch 51, when all the upper digits are "0", indicates a predetermined "save" or assigned area of the register. Thus, the read/write operation of the main memory 21 can be carried out more simply.

Referring now to FIG. 3, an example of a microprogram format which is applied to the invention will be explained.

Here, one format of the microprogram is made up of 36 bits (indicated by bits 0–35). The definitions of various control parts are as follows (the correspondence with hardware will be described with reference to FIGS. 4–6):

FUN — Part for designating the processing contents of an arithmetic and logic unit (ALU).

REG A — Part for designating a register (one of a group of registers) which delivers an output to an A bus.

REG B — Part for designating a register (one of the group of registers) which delivers an output to a B bus. The content of a C bus is written into this register when "write into register" is designated by a REG W part.

REG W — Part for designating whether or not the content of the C bus is written into the register designated by the REG W part (the content is written when REG W = 1).

MAR S — Part for designating whether or not the content of the C bus is written into a memory register (MAR) (the content is written when MAR S = 1).

SEL — Part for designating an output to a B' bus.

MEX — Part for designating the start for the main memory (start when MEX = 1).

M W — Part for designating read/write at the start of the main memory (write when M W = 1).

MOD — Part for designating the flow of the microprogram. (0, 0) and (0, 1) indicate a status in which an instruction fetch has been completed and a jump is made for each instruction execution processing routine. (1, 0) indicates a status in which the usual sequential processing is being done. (1, 1) indicates a status in which, if conditions designated by a part TEST exist, a jump is made to a microprogram designated by a JUMP ADDR part, and otherwise, a transfer is made to a microprogram of the next (+1) address.

LITERAL — Constant part. This is commonly used by FLAG TEST and JUMP ADDR parts.

FLAG — Part for designating the control of various kinds of flags. This becomes effective only when the MOD part is (1, 1).

TEST — Part for designating the test of various kinds of conditions. This becomes effective only when the MOD part is (1, 1).

JUMP ADDR — Jump address part of the microprogram at the time when the test condition exists.

In the ensuing description, these various control parts are shortly expressed as FUN, REG A, — as mentioned above.

Figure 4:
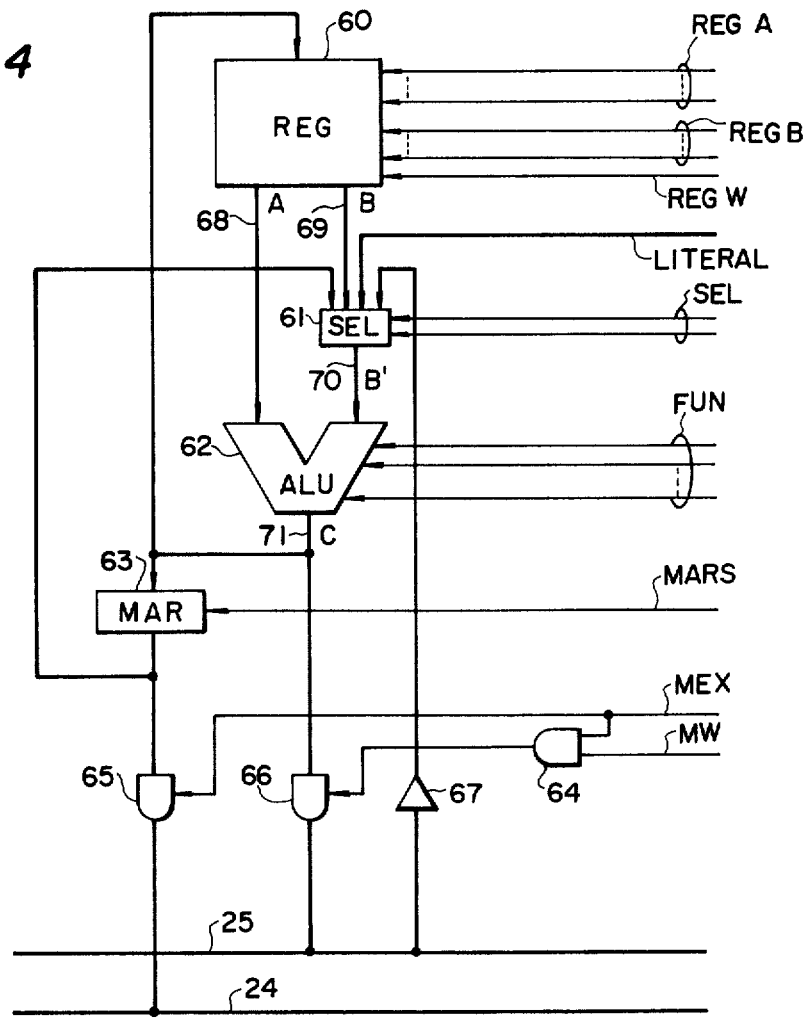
FIG. 4 is a diagram of an example of the construction of a data structure portion of a central processing unit.

FIG. 4 shows the construction of a data structure portion of the CPU 2. The group of registers (REG) 60 supply the contents of the registers designated by REG A and REG B parts to the A bus 68 and the B bus 69.

A selector 61 selects one of the four contents of the MAR 63, the B bus 69, the LITERAL part and the data from the data line 25 received by a receiver 67, and delivers the selected content to the B' bus 70.

The arithmetic and logic unit (ALU) 62 has the A bus 68 and the B' bus 70 as inputs thereof. After performing the processing designated by the FUN part, the ALU 62 delivers the result of the processing to the C bus 71.

The content of the C bus 71 is set in the MAR 63 if the MAR S part exists or is "1" (of course, the AND condition with a certain timing signal is examined, but such is omitted here in order to simplify the explanation). Further, it is set in the register designated by the REG B if the REG W part exists.

For a "write" operation into the main memory 21, the content of the MAR 63 is supplied to the address line 24 through a driver 65 by the MEX part. The MEX and MW parts enable a driver 66 through an AND gate 64, so that the output on the C bus 71 is delivered to the data line 25.

For a "read," operation only the content of the address line 24 is delivered, and the driver 66 is inhibited through the AND gate 64.

In this manner, the various processings are executed by the control parts of the microprogram.

Figure 5:
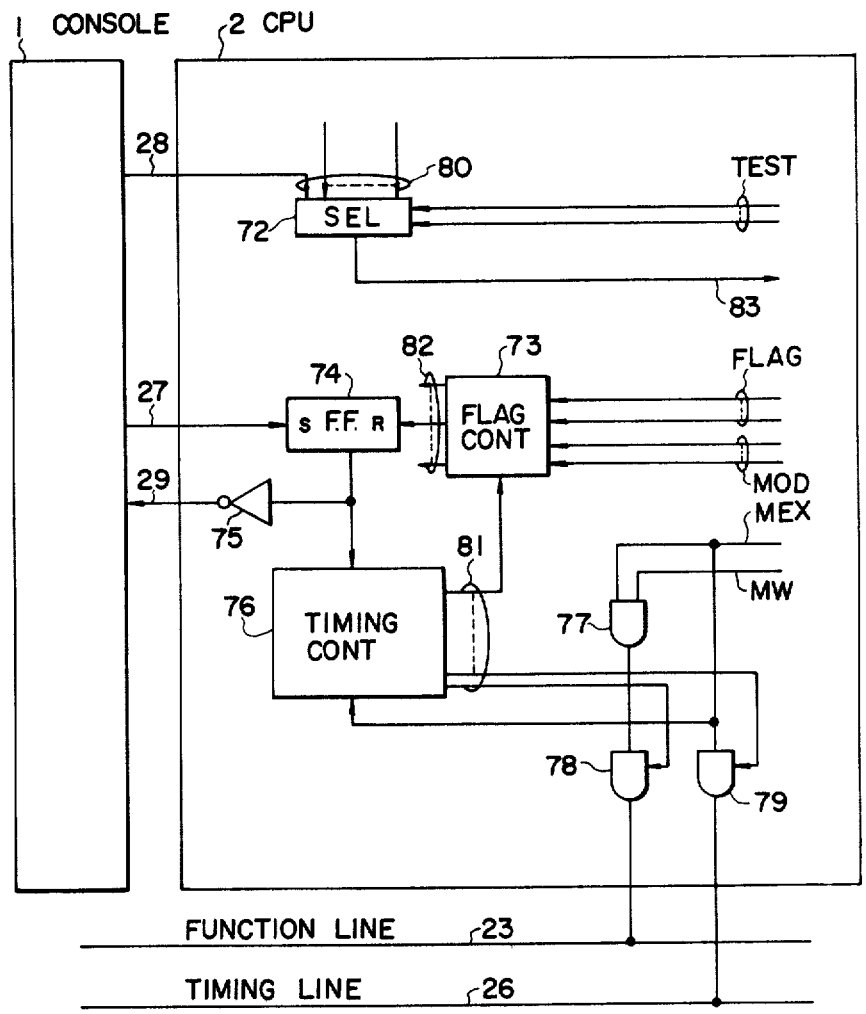
FIG. 5 is a diagram of an example of the hardware of a link portion of the central porcoessing unit with the console.

FIG. 5 shows the hardware of a linkage portion of the CPU 2 with the console 1.

The stop signal 28 from the console 1 enters as one of the various test conditions 80. One of the test conditions 80 is selected by the part TEST, and a test condition holding signal 83 is generated.

By receiving the FLAG and MOD parts a flag control circuit 73 delivers control signals 82 for the various flags. One of the control signals is a reset signal for a run status flip-flop 74. The reset signal resets the flip-flop 74, so that a timing control circuit 76 is stopped and that the CPU 2 falls into the stop status.

The output of the flip-flop 74 is delivered to the console 1 through a NOT gate 75 as the stop indicating status signal 29.

The start signal 27 from the console 1 becomes a set signal for the flip-flop 74, and the set signal results in turning the stop status of the CPU 2 into the run status. Timing control signals 81 of the timing control circuit 76 become control signals for the various components. They supply, for example, the timing of the flag control circuit 73, and the timings of drivers 78 and 79. When the signal MEX ("1") exists, a "start" signal is applied to the main memory 21 by the timing line 26 through the driver 79 at the timing. At this time, the function line 23 provides an output through an AND gate 77 and the driver 78.

Figure 6:
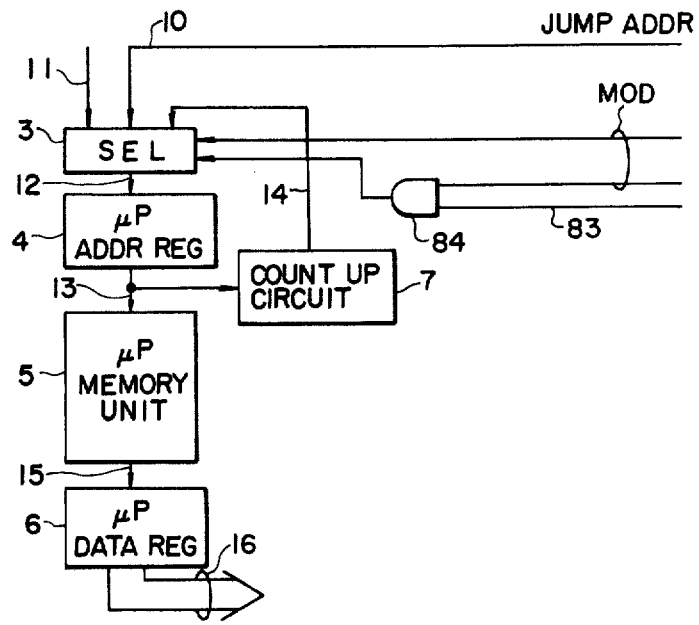
FIG. 6 is a diagram of a control portion for the flow of a microprogram.

The control part for the flow of the microprogram is illustrated in FIG. 6.

In FIG. 6, numeral 3 denotes a data selector, numeral 4 a microprogram address register, numeral 5 a microprogram memory unit, and numeral 6 a data register.

The data selector 3 selects a jump address 11 by an instruction code of an instruction execution routine, a jump address 10 by the jump designation of the microprogram, and the subsequent address 14 at a sequential mode. It sets them in the address register 4.

As already explained with respect to the MOD part, the selection of each address is effected by the MOD part of the microprogram format. Only at the test and jump designation, either the jump to the JUMP ADDR 10 or the advance to the next address 14 is determined. This is controlled by the test condition holding signal 83 and an AND gate 84.

By a microprogram address 13 being the output of the microprogram address register 4, a data signal 15 is read out from the corresponding address of the microprogram memory unit 5. It is set in the microprogram data register 6, and an operation designated by a data 16 thereof is conducted. The microprogram address 13 is counted up by a count-up circuit 7, and becomes the next address 14 at the sequential mode.

According to the invention, during the stop of the CPU 2, the contents of the group of registers are in or assigned to a predetermined storage area in the main memory 21, and at the initiation of the run of the CPU 2, the data are resumed to the group of registers from the predetermined storage area. Both these operations are effected by the microprogram control.

Figure 7:
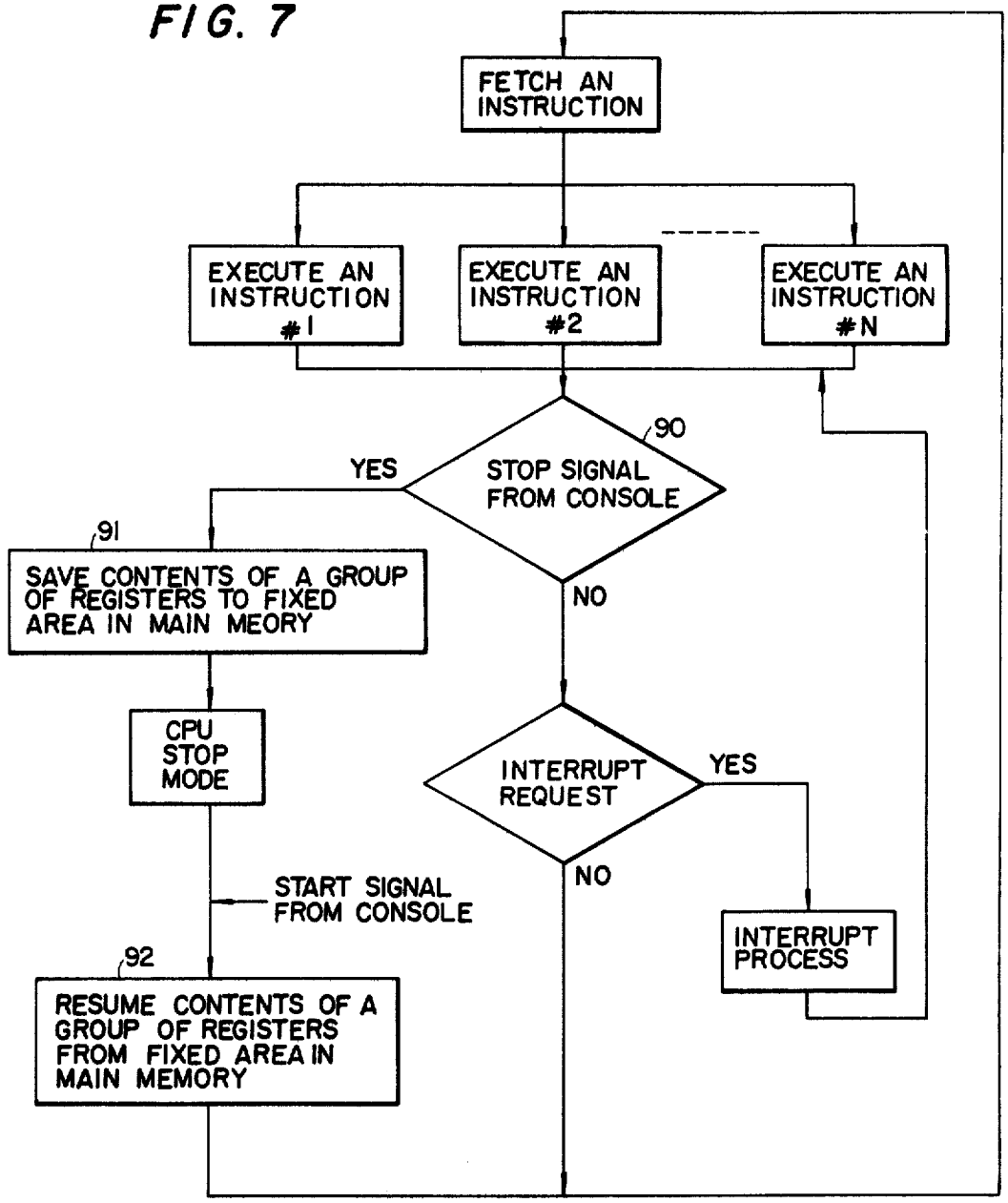
FIG. 7 is a diagram of an example of a processing flow in a central processing unit according to the invention.

The entire flow is illustrated in FIG. 7.

Usually, an instruction is fetched, and when the instruction has been executed, another instruction is fetched again. Where an interrupt request or a stop signal from the console is encountered, the processing is initiated after completion of the execution of the instruction.

In the presence of the stop signal, the stop status is established after assigning the contents of the group of registers into the predetermined storage areas of the main memory 21.

Under the stop status, the contents of the main memory 21 can be read out from the console 1. Accordingly, the contents of the registers is known ("read" operation). By writing necessary data into the predetermined storage areas and then issuing the start signal, it is possible to arbitrarily change the values of the registers and to run the CPU 2 ("write" operation).

According to such flow, the amount of hardwares for the read/write of the contents of the group of registers for the CPU 2 can be reduced.

A concrete example of a microprogram for realizing the flow of FIG. 7 is illustrated in FIG. 8.

Test processings 90 for the stop signal from the console are executed by the single microprogram. In the microprogram format, "test and jump" is designated by MOD = (1, 1), the stop signal from the console is designated by FLAG = 0000 (which shall signify that nothing be done) and TEST parts, a start address of processings 91 (for saving the contents of the group of registers into the predetermined storage areas of the main memory 21) is designated in the JUMP ADDR part (it is indicated by * in FIG. 8), and the other parts are set so as to do nothing.

Thus, where the stop signal from the console exists, it is entered into the processings 91. The processings 91 generate a fixed address $(0000)_{16}$ of the main memory 21 at the LITERAL part and set it in the MAR by the first microprogram. For this operation, one may designate at the FUN part the function of letting the content of the B' bus to pass to the C bus, to designate at the SEL part outputting LITERAL to the B' bus, to make the LITERAL part $(0000)_{16}$ and to make MAR S = 1.

By the next microprogram, the content of the 0-th register (#0) among the group of registers is written into the fixed address of the main memory 21 as designated by the MAR. For this operation, one may designate at the FUN part the function of letting the data of the A bus to pass to the C bus, to select the register #0 at the REG A part, and to make MEX = 1 and M W = 1 so as to designate "write" of the main memory 21.

Thereafter, the contents of the group of registers up to register #15 are written into the fixed areas $(0000)_{16}$ - $(000F)_{16}$ of the main memory 21. The run status flip-flop may be reset by the last microprogram.

For the resetting operation, one may make MOD = (1, 1) to designate the reset of the run status flip-flop at the FLAG part to designate an unconditional jump at the TEST part and designate the start address of processings 92 (for resuming the contents of the fixed areas of the main memory into the group of registers) at the JUMP ADDR part (it is indicated by ** in the Figure). Under this state, the CPU 2 stops. When the run status flip-flop is set by the start signal from the console 1, the processings 92 are executed.

The processings 92 generate the main memory fixed address $(0000)_{16}$ at the LITERAL part and set it in the MAR by the first microprogram. The content of the main memory fixed address $(0000)_{16}$ is written into the register #0 by the next microprogram.

For this operation, one may designate at the FUN part the function of letting the data of the B' bus to pass to the C bus, designate the register #0 at the REG B part, to make REG W = 1, designate at the SEL part outputting the content of the data bus to the B' bus, and to make MEX = 1 and M W = 0 (to designate "read" of the main memory). Such a procedure is repeated for the registers #0–#15, and a jump is made to the start address of the instruction fetch processing by the last microprogram.

The flow of FIG. 7 is realized in the above way.

As set forth above, according to the invention, no special hardware is required within the CPU in order to read or write the contents of the group of registers within the CPU from the console, and hence, the hardware construction of the CPU becomes compact to that extent.

We claim:

1. A system for stopping and restarting the operation of a data processor, which has a central processing unit which is operative under the existence of a timing signal, a console from which start and stop signals are supplied to the central processing unit, and a main memory, the contents of which can be directly accessed by the central processing unit and the console, the system comprising
- means for suspending an executed program and assigning the contents of a group of registers within said central processing unit to predetermined fixed areas of said main memory in response to a stop signal from said console,
- means for stopping the timing signal of said central processing unit after said assignment of the contents, and
- means for restarting the timing signal of said central processing unit and restoring the contents of said fixed areas to said group of registers in response to the start signal from said console.

2. A system according to claim 1, further including means for, during the stop state of the timing signal, carrying out read/write operations, normally assigned for the contents of said registers, on the contents of said predetermined fixed areas of said main memory, in response to read/write control signals from said console.

3. A system according to claim 1, wherein said console is provided with address switches and an address rotary switch designating the upper digits and lower digits of addresses of said main memory by said address switches and said address rotary switch, respectively, and including control means for causing the fixed areas of said main memory to correspond with the lower digits of said addresses so as to designate said fixed areas of said main memory by said address rotary switch.

4. In a system for stopping and restarting the operation of a data processor, which has a central processing unit which is operative under the existence of a timing signal, a console from which start and stop signals are supplied to the central processing unit and a main memory, the contents of which can be directly accessed by the central processing unit and the console, a method of operating said system comprising the steps of:
- (a) temporarily storing the contents of registers within said central processing unit in predetermined fixed areas of said main memory in response to a stop signal from said console and stopping the timing signal of said central processing unit after said assignment of the contents of said registers; and
- (b) upon receipt of a start signal from said console, restarting the timing signal of said central processing unit and restoring the contents of said fixed areas of said main memory to said registers within said central processing unit.

5. A method according to claim 4, further including the step of:
- (c) during the stop state of the timing signal, carrying out read/write operations, normally assigned for the contents of said registers, on the contents of said predetermined fixed areas of said main memory, in response to read/write control signals from said console.

* * * * *